US008814988B2

(12) United States Patent
Casara

(10) Patent No.: US 8,814,988 B2
(45) Date of Patent: Aug. 26, 2014

(54) PROCESS AND APPARATUS FOR RECOVERING AMMONIA FROM A GAS STREAM

(75) Inventor: Paolo Casara, San Donato Milanese (IT)

(73) Assignee: Saipem S.p.A., San Donato Milanese (IT)

( * ) Notice: Subject to any disclaimer, the term of this patent is extended or adjusted under 35 U.S.C. 154(b) by 0 days.

(21) Appl. No.: 13/387,836

(22) PCT Filed: Jul. 27, 2010

(86) PCT No.: PCT/EP2010/004765
§ 371 (c)(1),
(2), (4) Date: Mar. 14, 2012

(87) PCT Pub. No.: WO2011/012324
PCT Pub. Date: Feb. 3, 2011

(65) Prior Publication Data
US 2012/0189528 A1 Jul. 26, 2012

(30) Foreign Application Priority Data

Jul. 30, 2009 (IT) .............................. MI2009A1372

(51) Int. Cl.
*B01D 53/14* (2006.01)
(52) U.S. Cl.
USPC .................. 95/178; 95/179; 95/193; 95/194; 95/209; 95/232
(58) Field of Classification Search
None
See application file for complete search history.

(56) References Cited

U.S. PATENT DOCUMENTS 4,149,857 A    4/1979  Volke et al.
6,245,556 B1   6/2001  Sako et al.
6,458,745 B1 * 10/2002 Runge et al. .................. 504/359
6,592,840 B1 *  7/2003 Fischer et al. ................ 423/584
6,890,675 B2 *  5/2005 Koschany ..................... 429/439
7,977,520 B2 *  7/2011 Borgmann et al. ........... 585/504
8,153,845 B2 *  4/2012 Oftring et al. ................ 564/490
2002/0014154 A1 * 2/2002 Witzko et al. .................. 95/178
2010/0089110 A1   4/2010 Duncan et al.
2011/0091369 A1 * 4/2011 Casara et al. ................. 423/356
2012/0039787 A1   2/2012 Casara et al.

FOREIGN PATENT DOCUMENTS

| EP | 2386346 A1 * | 11/2011 |
| GB | 1 197 741    | 7/1970  |
| WO | 03 099721    | 12/2003 |
| WO | 2008 141195  | 11/2008 |

OTHER PUBLICATIONS

English EP2386346A1 (Nov. 16, 2011) accessed Sep. 5, 2013.*

* cited by examiner

*Primary Examiner* — Duane Smith
*Assistant Examiner* — Phillip Shao
(74) *Attorney, Agent, or Firm* — Oblon, Spivak, McClelland, Maier & Neustadt, L.L.P.

(57) ABSTRACT

The present invention relates to a process for the recovery of ammonia contained in a gaseous stream, said process comprising the following phases: (a) subjecting the gaseous stream containing ammonia to a washing with an aqueous washing solution having a pH lower than 7.0, with the formation of a purified gaseous stream and an aqueous solution containing an ammonium salt; (b) treating the aqueous solution containing the ammonium salt coming from phase (a) in a vertical falling film heat exchanger at a temperature from 50 to 250° C. and an absolute pressure ranging from 50 KPa to 4 MPa with the formation of a regenerated washing solution and a gaseous stream comprising $NH_3$ and $H_2O$; (c) recycling said regenerated washing solution to phase (a). The present invention also relates to equipment for effecting the above process.

21 Claims, 1 Drawing Sheet

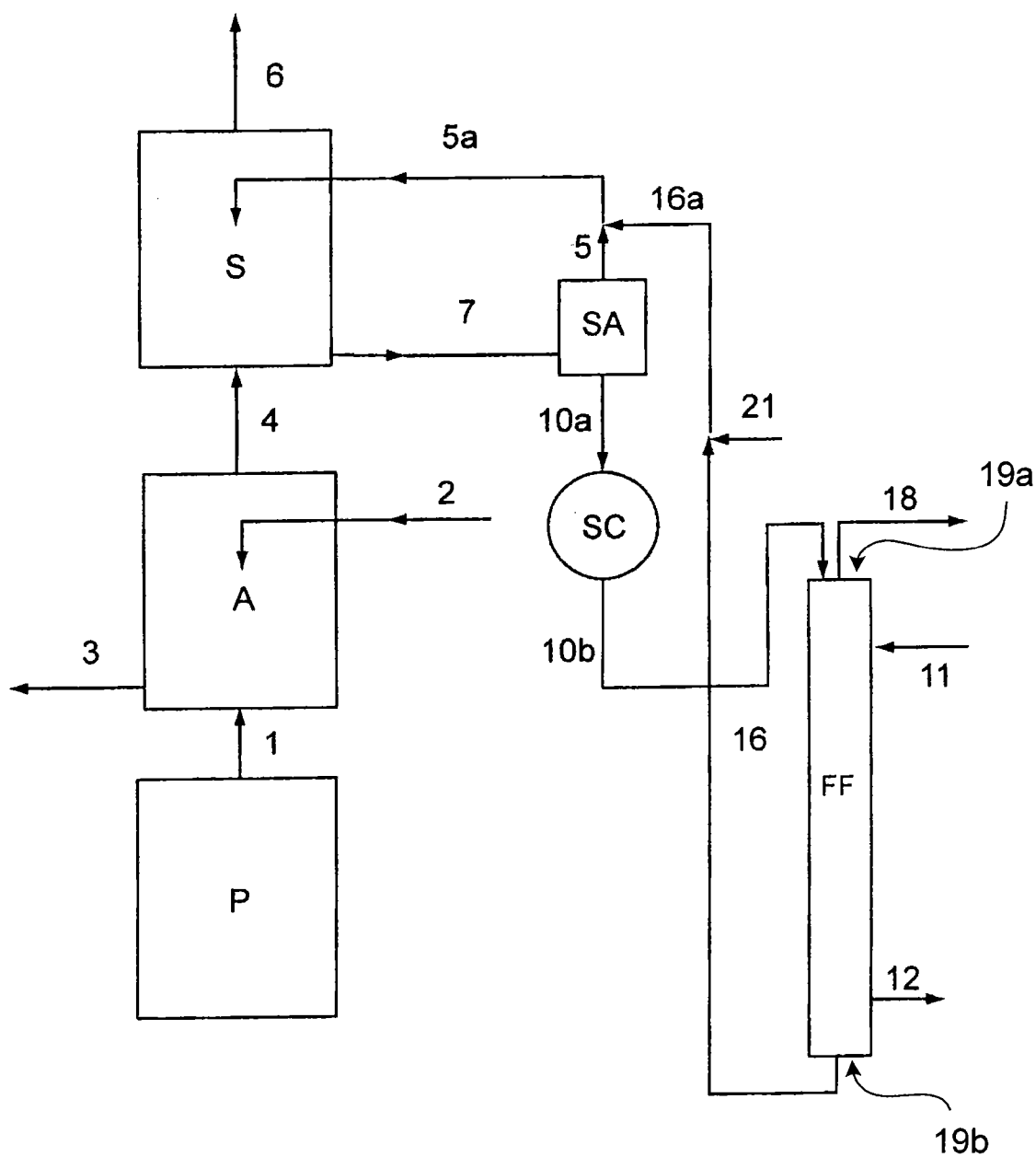

PROCESS AND APPARATUS FOR RECOVERING AMMONIA FROM A GAS STREAM

The present invention relates to a process for the recovery of ammonia from a gaseous stream.

The process, object of the present invention, is particularly suitable for the recovery of ammonia from a gaseous stream coming from a synthesis process of urea.

Emissions of gaseous ammonia into the atmosphere produced by numerous industrial activities represent a particularly significant environmental problem.

In order to limit the environmental impact associated with this pollutant, national and international environmental regulations are imposing increasingly restrictive limits with respect to emissions into the atmosphere coming from industrial processes. The necessity is therefore strongly felt for finding new technical solutions for abating ammonia in industrial emissions or for recovering ammonia from these streams, considering the high commercial value of this substance as raw material in numerous industrial processes.

In particular, the synthesis process of urea is an industrial process which generates high volumes of gaseous streams containing ammonia.

The synthesis of urea is effected by the reaction of ammonia and carbon dioxide at high pressure and temperature, the subsequent separation of the urea from the mixture containing the non-reacted products and recycling of the same to the reactor.

All industrial processes for the preparation of urea are therefore based on direct synthesis according to the following reaction:

$$2NH_3 + CO_2 \leftrightarrow CO(NH_2)_2 + H_2O \quad (A)$$

This synthesis takes place in two distinct reaction steps:

$$NH_3 + CO_2 \leftrightarrow (NH_2)COONH_4 \quad (A')$$

$$(NH_2)COONH_4 \leftrightarrow CO(NH_2)_2 + H_2O \quad (A'')$$

In the first step (A') an exothermic equilibrium reaction takes place having a high reaction rate at room temperature, which however, at the high temperatures required by step (A''), requires high pressures to reach a favourable equilibrium.

In the second step (A'') an endothermic reaction takes place, which only reaches a significant rate at high temperatures (>150° C.), with an equilibrium state which, at 185° C., starting from a mixture of reagents in a stoichiometric ratio, leads to a $CO_2$ conversion slightly higher than about 50%. This unsatisfactory conversion can be conveniently increased by raising the $NH_3/CO_2$ ratio.

Processes for the production of urea by direct synthesis starting from ammonia and carbon dioxide have been widely illustrated and described in the specific literature of the field. A large review of the most common processes for the production of urea can be found, for example, in "Encyclopedia of Chemical Technology" Ed. Kirk-Othmer, Wiley Interscience, fourth ed. (1998), Supplement, pages 597-621.

Industrial processes for the production of urea normally carry out the synthesis in a reactor fed with $NH_3$, $CO_2$ and with the aqueous solutions of ammonium carbonate and/or carbamate coming from the recycled streams of the non-converted reagents, at temperatures ranging from 150 to 215° C., at pressures of at least 130 atm, with a $NH_3/CO_2$ molar ratio of between 2.5 and 5, calculated with respect to the sum of the feeding streams, including ammonia in the form of ammonium salt. In addition to the water formed and excess $NH_3$ fed, the reactor eluent still contains considerable quantities of $CO_2$, mainly in the form of non-converted ammonium carbamate.

The molten urea is solidified in the final section of the plant, into granular form, in suitable granulators or prilling towers, by cooling with air.

Many of the environmental problems associated with urea production plants are specifically linked to the above-mentioned granulation or prilling sections.

The processes which are effected in this section, in fact, currently cause the emission into the atmosphere of large quantities of air contaminated by ammonia (about 50-250 mg/Nm³ air), urea (about 20-200 mg/Nm³ air) and traces of formaldehyde.

Ammonia is also contained, also in relatively high concentrations, up to 10 g/Nm³, in industrial gaseous streams such as those produced in the distillation of coke, from which it can be conveniently extracted and used as raw material in industry.

The state of the art describes various abatement processes of the ammonia contained in gaseous streams. Various industrial processes have also been developed, which enable not only the separation but also the recovery of pure ammonia. For the recovery of ammonia from coking gases, for example, the patent U.S. Pat. No. 3,024,090 describes a process in which the gases are subjected to a washing with an acid solution of ammonium phosphate (mixture of mono-acid phosphate and di-acid phosphate), followed by a stripping of the solution. This method however does not reach high efficiency rates and cannot be applied to gaseous streams with low ammonia contents.

U.S. Pat. No. 4,424,072 describes an abatement process of ammonia contained in a low concentration in a gaseous stream by means of acid washing, for example with nitric acid, to obtain an ammonium salt in aqueous solution.

In particular, when the gaseous stream containing ammonia which is subjected to acid washing, is a gaseous stream coming from the final prilling or granulation section of a urea synthesis process, the aqueous solution containing the ammonium salt also contains urea and traces of formaldehyde.

The aqueous solution containing the ammonium salt cannot be recycled as such to the synthesis and/or concentration sections of urea, as the latter could thus be contaminated by ammonium salts, which are absolutely undesirable for the purposes of certain subsequent uses of urea, for example for the synthesis of melamine.

Furthermore, the ammonium salt thus obtained would have such specifications as to make it unusable, as it is not at all suitable for the purposes of market interest.

In order to favour the recovery of ammonia, the solution treated with the techniques of the known art described above is heated in order to favour the formation of a gaseous stream rich in $NH_3$. In U.S. Pat. No. 3,024,090, the heating generally takes place by the introduction of vapour into the aqueous solution containing the ammonia to be separated. The introduction of vapour, however, has the disadvantage of causing the dilution of the ammonia recovered and consequently of reducing the overall effectiveness of the separation process. Furthermore, heating by the introduction of vapour into the feeding stream does not allow an easy control of the temperature at which the stripping process is effected.

The known art indicates that the recovery of ammonia is greatly influenced by the pH of the solution, proving to be effective only if applied to solutions containing ammonia in which the pH is raised to values of around 11 by the addition of basifying agents. On an industrial scale, the separation of ammonia carried out under the above conditions, has the evident disadvantage of using up high quantities of basifying agent, with a consequent increase in the costs of the ammonia recovery process.

The Applicant has now found a process which allows the drawbacks of the known art described above to be overcome, further improving the recovery process of ammonia from a gaseous stream.

An object of the present invention therefore relates to a process for the recovery of ammonia contained in a gaseous stream, said process comprising the following phases:
(a) subjecting the gaseous stream containing ammonia to a washing with an aqueous washing solution having a pH lower than 7.0, with the formation of a purified gaseous stream and an aqueous solution containing an ammonium salt;
(b) treating the aqueous solution containing the ammonium salt coming from phase (a) in a vertical falling film heat exchanger at a temperature from 50 to 250° C. and an absolute pressure ranging from 50 KPa to 4 MPa absolute with the formation of a regenerated washing solution and a gaseous stream comprising $NH_3$ and $H_2O$;
(c) recycling said regenerated washing solution to phase (a).

In a preferred embodiment of the above process, the gaseous stream comprising $NH_3$ and $H_2O$ leaving phase (b) is recycled to a urea synthesis process.

An object of the present invention also relates to equipment for effecting the above process, comprising:
a washing unit (scrubber) in which a gaseous stream containing ammonia is put in contact with an aqueous washing solution,
a vertical falling film heat exchanger for treating an aqueous stream of an ammonium salt with the formation of a gaseous stream comprising $NH_3$ and $H_2O$ and a regenerated washing solution, said heat exchanger being connected to the washing unit from which it receives the aqueous stream of an ammonium salt.

The gaseous stream treated according to the process of the present invention can derive from various industrial processes, and is preferably a gaseous discharge stream coming from a synthesis process of urea.

The gaseous discharge stream can derive from various sections and equipment of the urea synthesis process. In the preferred and most relevant case, as a result of the gas volumes normally involved, it comes from the urea solidification section which, as is known, represents the part of the synthesis plant in which the urea, molten or in a concentrated solution, is cooled and solidified into a generally granular form, suitable for transportation and its use in agriculture. Various solidification technologies are possible, the most common and preferred, as previously described, being known as granulation and prilling, which use, as cooling agent, a gaseous stream in large volumes.

There are, however, also other sources of gaseous discharge or vent streams containing ammonia as polluting agent in urea plant, which cannot be released without an adequate recovery treatment, such as the streams in the suction ducts situated in different areas of the plant, in the storage areas, or the discharge streams of inert products. All these streams can be treated according to the present invention, obtaining the double advantage of an improvement in the environmental impact and a further recovery of ammonia to be recycled to the plant. A gaseous discharge stream coming from the synthesis process of urea, the solidification section in particular, generally consists of a gas contaminated by ammonia (about 50÷250 mg/$Nm^3$ gas), urea (about 30÷200 mg/$Nm^3$ gas) and traces of formaldehyde.

This gas normally consists of air, but processes which use an inert gas different from air are not excluded from the scope of the present invention; in which case, said gaseous discharge stream mainly consists of said inert gas, preferably selected from nitrogen, noble gases, methane or a mixture thereof.

The gaseous discharge stream preferably comes from the urea synthesis process at a temperature of about 45-100° C. and is subjected to a preliminary washing with water to eliminate most of the urea and formaldehyde present. Also in this case, however, the gaseous discharge stream which is subjected to phase a) of the process according to the present invention, still contains urea and traces of formaldehyde.

Through the treatment of the subsequent phase b), the urea at least partially hydrolyzes to give $CO_2$ and $NH_3$; this represents a particular advantage with respect to the processes of the state of the art, as the accumulation of urea in the washing solution, as a result of the recycling (phase (c)) of the regenerated washing solution can progressively reduce the efficiency of the scrubber. Furthermore, thanks to the partial hydrolysis of the urea, it is possible to recover further ammonia from the urea, at the same time avoiding its dispersion into the environment.

Phase (a) is preferably effected with an aqueous washing solution having a pH ranging from 5 to 6.5, regardless of the presence or absence of urea in the gaseous stream to be treated. The temperature of the washing solution is conveniently maintained at 15 to 70° C.

The aqueous washing solution used in phase (a) is preferably a buffer solution consisting of a conjugate acid-base pair whose pH falls within the range defined above. Typical buffer solutions suitable for the purpose are, for example, those consisting of a conjugate acid-base pair deriving from phthalic acid, oxalic acid, phosphoric acid, citric acid, aryl- and alkyl-phosphonic acids, carbonic acid ($CO_2$ in water). The molar ratio between conjugate acid and base is determined on the basis of the pH desired according to the laws of chemical equilibrium.

The washing in phase (a) is more preferably effected with a buffer solution consisting of the conjugate acid-base pair $H_2PO_4^-$/$HPO_4^{2-}$ (hereafter also indicated as "diacid phosphate/monoacid phosphate pair"), at a temperature ranging from 40 to 60° C.

In this case, during the treatment of the gaseous stream in phase (a), the species of the conjugate acid-base pair $H_2PO_4^-$/$HPO_4^{2-}$ react with the gaseous ammonia, shifting the equilibrium towards the formation of $(NH_4)HPO_4^-$. Even more preferably, the buffer solution consists of a mixture in equilibrium of the same ammonium salts $(NH_4)_2HPO_4$ and $(NH_4)H_2PO_4$, present in the aqueous solution of phase (a) in dissociated form. The absorption of ammonia, however, produces the formation of further $(NH_4)_2HPO_4$ and the solution leaving phase (a) is therefore enriched with the ammonia present in the gaseous stream treated.

The overall molar concentration of the conjugate acid-base pair in the washing solution used in phase (a) preferably ranges from 0.5 M to 5 M, preferably from 1 M to 4 M. Suitable buffer solutions consisting of the diacid phosphate/monoacid phosphate pair have an overall concentration of the species $H_2PO_4^-$ e $HPO_4^{2-}$ ranging from 20 to 40% by weight, preferably from 30 to 35% by weight.

When the process according to the present invention is applied to a gaseous stream containing ammonia coming from a urea synthesis plant, the aqueous solution containing the ammonium salt leaving phase (a) also contains urea and traces of formaldehyde.

The gaseous stream leaving phase (a) of the process according to the present invention is a stream substantially free of ammonia. The gaseous stream leaving phase (a) consists of substantially pure air or another inert gas (for example nitrogen). If the gaseous stream treated in phase (a) comes from a urea synthesis process, for example, the gaseous stream leaving the same phase (a) typically has an ammonia content ranging from 10 to 25 mg/Nm$^3$ gas and a urea content ranging from 5 to 30 mg/Nm$^3$ gas. If the purified gaseous stream consists of air or nitrogen, it can be released into the atmosphere without further treatment as it is conformant with the environmental regulations in force.

The phase (b) of the process according to the present invention provides that the aqueous solution containing the ammonium salt coming from phase (a) is treated in a vertical falling film heat exchanger at a temperature ranging from 50 to 250° C. and a pressure ranging from 50 KPa to 4 MPa absolute, with the formation of a regenerated washing solution and a gaseous stream comprising ammonia and water in the form of vapour.

A falling film heat exchanger is a tube-bundle heat exchanger, positioned vertically, used in the art for effecting the heat exchange between two fluids. This type of equipment is particularly effective when-phase transformations or chemical reactions take place on one or both sides of the heat exchange wall as a result of the heat flow.

Falling film heat exchangers (hereafter also indicated with the term "FF evaporator") which can be used for the purposes of the present invention, normally consist of a cylindrical chamber, arranged in a vertical position, through which a series of tubes pass longitudinally. The tubes are seal-fixed on two transversal plates (called tube plates), each of which faces a collection or distribution chamber of the gases or liquids respectively, passing inside the tubes. Outside the tubes, in the space between the internal wall of the chamber and outer wall of the tubes (so-called mantle side) an exchanger fluid circulates, consisting of a stream of hot gases coming for example from a combustion process or consisting of a stream of saturated water vapour.

In FF evaporators, the solution to be treated descends by gravity along the internal walls of the tubes in the form of a liquid film, in this way creating an efficient heat exchange with the fluid flowing on the mantle side, reducing the contact times as much as possible. During the descent of the film, the vapours possibly formed by evaporation or chemical reaction (for example, thermal decomposition) due to the heating, are easily released through the high surface of the liquid film and can be removed along the internal duct of the tube, substantially free of liquids. In a preferred embodiment, phase (b) of the process of the present invention is carried out in a FF evaporator with essentially no reflux, in order to avoid any backmixing and absorption of the ammonia gas formed in the vertical tubes in the acqueous solution coming from phase (a).

Vertical falling film heat exchangers can have several forms and geometries, both internally and externally. They are suitably constructed according to criteria typical of tube-bundle heat exchangers for plants operating with high-pressure fluids.

In a preferred embodiment of the process, object of the present invention, the FF evaporator has a cylindrical form with two semispherical caps situated at the ends of the cylinder, for a better distribution of the pressure thrust. The external wall of the equipment, which sustains almost the whole pressure thrust, consists of a casing, also called force body, having a thickness calculated in relation to the pressure to be sustained and normally varying from 10 to 100 mm. The outer wall of the FF evaporator can conveniently have different thicknesses in relation to the pressure which it must effectively sustain. The wall of the caps and cylinder close to these preferably has a typical thickness ranging from 10 to 80 mm, whereas the central cylindrical area, in contact with the exchanger fluid (usually saturated vapour), has lower thickness, preferably from 10 to 40 mm.

Inside the FF evaporator there are at least three distinct cavities (or chambers) separated from each other by two septa or plates suitably arranged transversally with respect to the main axis of the apparatus, and also comprising a flat element (for example, made of carbon steel), having a thickness normally ranging from 40 to 400 mm, suitable for sustaining the pressure difference normally existing between the cavities defined thereby. In the most common case, the two plates are each situated close to one of the two caps and define a central volume having an essentially cylindrical geometry. Each plate is seal-fixed onto the circular wall by welding, so that there cannot be any exchanges of material between adjacent cavities.

The number of tubes present in an FF evaporator varies from a minimum of 2 to about 7,000, preferably from 100 to 4,000. The diameter of the tubes preferably ranges from 10 to 100 mm. The length of the tubes normally coincides with the length of the central body of the apparatus and preferably ranges from 1 to 10 m. The form of the tubes is generally linear, even if tubes comprising curved or toroidal parts can be used at times, and the thickness of the wall can vary, depending on the load to be sustained and the diameter, from 1 to 15 mm. Each tube preferably has a thickness ranging from 1 to 10 mm, more preferably from 1 to 8 mm. Intermediate septa (also called baffles) can be positioned in the intermediate cavity to support the tubes. These are normally made of carbon steel and have a thickness of a few millimeters, as they do not have to sustain any pressure thrust.

For the purposes of the invention, the vertical falling film heat exchanger can be produced using the materials generally used for the production of walls and tubes of industrial chemical plants.

Considering the operative conditions envisaged for phase (b) of the process, object of the present invention, the walls and tubes of the evaporator FF are preferably made of steel or stainless steel (for example, austenitic stainless steel, stainless steel of the type 25/22/2 Cr/Ni/Mo, austeno-ferritic stainless steels).

According to the process, object of the present invention, the aqueous solution containing the ammonium salt coming from phase (a) is introduced into the falling film evaporator, where it is maintained at a temperature ranging from 50 to 250° C., preferably from 100 to 220° C., and a pressure ranging from 50 KPa to 4 MPa absolute.

During the downward falling of the liquid film, due to the heat transmitted from the surface of the tubes to the liquid film, the ammonia and a part of the water of the aqueous solution are evaporated with the consequent formation of a gaseous stream comprising ammonia and water. The gaseous stream moves upwards, parallelly to the direction of the falling liquid film and in countercurrent with respect to the latter, and exits from the top of the evaporator.

Preferably, each vertical tube is loaded with an amount of acqueous solution from 24 to 180 liter/h. The average residence time of the liquid within the tube preferably ranges from 2 to 40 seconds. It has been been found that such a short contact time within each tube is particularly advantageous in order to avoid any danger of solid deposition from the concentrated solution of the ammonium salt, especially when phase (b) is carried out at elevated temperatures in order to decompose the residual urea.

If the gaseous stream fed to phase (a) is a discharge stream coming from a urea synthesis plant, the above gaseous stream leaving phase (b) preferably also comprises $CO_2$.

In phase (b), due to the treatment conditions applied, there is a shift in the equilibria of the conjugate acid-base pair of the buffer solution, together with the formation of neutral ammonia which, upon evaporating, is separated from the solution treated in the vertical falling film heat exchanger.

In the non-limiting case in which an aqueous washing solution is used in phase (a), consisting of a buffer solution containing the conjugate acid-base pair $H_2PO_4^-/HPO_4^{2-}$, the following reaction (1) takes place in phase (b):

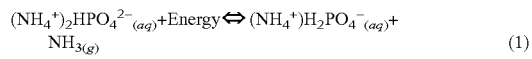
(1)

wherein the term "Energy" represents the total energy supplied to the solution containing the ammonium salt subjected to treatment in the FF evaporator, said energy depending on the operating conditions of temperature, pressure, etc., which contribute to shifting the equilibrium towards the formation of the diacid phosphate ion and free ammonia.

The operating conditions of phase (b) are selected by the expert in the field so as to guarantee the equilibrium shift of the reaction (1) towards the formation of free ammonia in gaseous form.

The free ammonia obtained by the equilibrium shift of the phosphorous and ammonium ions in aqueous solution evaporates from the film of solution treated according to the phase equilibrium under the pressure and temperature conditions of the process and is separated as a gaseous stream.

Phase (b) is preferably carried out by heating the FF evaporator by the introduction into the mantle of an exchanger fluid, consisting of saturated water vapour at a pressure ranging from 0.1 to 7 MPa.

The temperature and pressure conditions in phase (b) must be selected so as to lead to the formation of the regenerated washing solution and gaseous stream containing ammonia. In particular, the operating conditions must be such as to obtain the evaporation of gaseous ammonia from the surface of the falling film.

If the gaseous stream from which the ammonia is recovered does not contain urea, phase (b) is preferably carried out at a temperature ranging from 110 to 140° C. and a pressure ranging from atmospheric pressure to about 200 KPa absolute.

If the gaseous stream fed to phase (a) also contains urea (for example, a discharge stream coming from a urea synthesis plant), phase (b) is preferably carried out at a temperature ranging from 100 to 230° C., more preferably from 120 to 210° C., and at a pressure ranging from atmospheric pressure to 2 MPa absolute, preferably from 0.15 to 1.5 MPa absolute.

In a preferred embodiment of the present invention, by treating in phase (b) an aqueous solution also comprising urea at about 0.7 MPa and a temperature of about 180° C., it is possible to obtain a stream comprising $NH_3$, $H_2O$ and $CO_2$ characterized by a concentration of ammonia ranging from 5 to 35% by weight, more preferably from 10 to 25% by weight.

The treatment in the FF evaporator is preferably effected in self-stripping, i.e. in the absence of an additional carrier stream. In order to obtain a greater extraction of $NH_3$, a gaseous carrier stream (for example a stream of $NH_3$, water vapour, $CO_2$ or other inert gas) can be introduced into the tubes of the FF evaporator which, upon coming into contact with the surface of the liquid film in countercurrent, removes the ammonia extracted, favouring the evaporation of additional ammonia from the solution subjected to treatment.

The treatment of phase (b) in the FF evaporator returns the following products: a regenerated washing solution, preferably with a pH ranging from 5 to 6.5, and a gaseous stream containing ammonia and possibly $CO_2$.

The regenerated aqueous washing solution is subsequently used for abating further ammonia from the starting gaseous stream in phase (a) of the process according to the present invention, i.e. it is recycled (phase c) to the so-called scrubber phase, after possible recovery of the heat contained therein and/or concentration, for example by means of evaporation under vacuum. Before being recycled to phase (a), the regenerated aqueous washing solution may require the addition of the quantity of water and acid or buffer solution necessary for maintaining the desired concentration and pH (make-up solution).

The ammonia contained in the gaseous stream leaving phase (b) can be used in different ways. In a preferred embodiment of the above process, the gaseous stream comprising $NH_3$, $H_2O$ and possible $CO_2$, leaving phase (b), is recycled to a urea synthesis process. Alternatively, the above gaseous stream can be fed to a synthesis process of ammonia. In both cases, before being fed to these plants, the gaseous stream comprising ammonia can be optionally subjected to recovery of the heat contained therein by means of a suitable heat exchanger. The gaseous stream comprising ammonia leaving phase (b) can also be condensed to form an aqueous solution of ammonia which can be recycled to other industrial processes.

In a preferred embodiment which envisages the use in phase (a) of a washing solution consisting of a buffer solution in which the conjugate acid-base pair is $H_2PO_4^-/HPO_4^{2-}$, the solution of $(NH_4)_2HPO_4$ and $(NH_4)H_2PO_4$ coming from phase (a) and sent to treatment in the FF evaporator has a concentration of $NH_4^+$ ions ranging from 3 to 12% by weight.

In one embodiment, the FF evaporator used for the treatment of phase (b) returns the following main products:
- a regenerated aqueous washing solution consisting of a buffer solution containing the species $HPO_4^{2-}$ and $H_2PO_4^-$, in a quantity ranging from 20 to 40% by weight, preferably from 30 to 35% by weight, which is recycled to the so-called scrubbing phase (washing), after the possible addition of the required quantity of water and make-up solution;
- a gaseous stream comprising from 5 to 35%, preferably from 10 to 25%, by weight of ammonia.

The improved process according to the present invention therefore allows the recovery of polluting products such as ammonia and urea contained in a gaseous stream, advantageously allowing concentrated ammonia solutions to be obtained. These solutions consequently do not require specific thermal treatment before being recycled to further industrial processes, such as for example the synthesis of urea. The process therefore has a high energy efficiency.

Furthermore, with respect to other processes used in the state of the art, the use of an FF evaporator offers the considerable advantage of avoiding the mixing of the ammonia separated with the heating fluid (vapour) and the consequent dilution of the gaseous stream recovered. The heat exchange mechanism, moreover, on which the functioning of FF evaporators is based, allows an accurate control of the temperature conditions of the aqueous solution subjected to the recovery treatment of ammonia. FF evaporators also operate effectively in the presence of narrow temperature differences between the heating fluid and aqueous solution subjected to treatment, with a consequent further reduction in energy consumption.

Furthermore, with respect to the separation processes known in the state of the art, the recovery process of ammonia according to the present invention offers the advantage of being able to be effected with substantially non-basic solutions, with consequent reduced consumptions of basifying compounds.

BRIEF DESCRIPTION OF THE DRAWINGS

FIG. 1 shows the treatment steps of a gaseous discharge stream leaving the prilling or granulation section of a synthesis process of urea.

In the case of the application of the process according to the present invention to the recovery of ammonia from a gaseous stream also comprising urea, a further advantage can also be found in the possibility of substantially eliminating all the urea present: in phase (b), in fact, the temperature and pressure conditions cause the hydrolysis of a fraction of urea, whereas, as the remaining fraction is recycled to phase (a), it is not dispersed in the environment.

A preferred embodiment of the process according to the present invention is illustrated in the enclosed FIG. 1, which schematically represents the treatment steps of a gaseous discharge stream leaving the prilling or granulation section of a synthesis process of urea.

The functional details, such as pumps, valves and other items of equipment not significant for a full understanding of the schematized processes, are not shown in the above-mentioned FIG. 1. The process, object of the present invention, should in no case be considered as being limited to what is shown and described in the enclosed figure, which has a purely illustrative function.

Furthermore, in order to simplify the present description, the term "liquid" is used indifferently with reference to streams or mixtures which consist of either a single liquid phase or a mixed liquid-vapour phase. The term "gaseous", on the other hand, is used for streams or mixtures in which the liquid phase is substantially absent.

The scheme shown in FIG. 1 illustrates a prilling or granulation section P, connected through line 1 to a washing section with water A, possibly coming from the urea plant and containing impurities of ammonia and urea. This section A comprises a water inlet line 2, an outlet line 3, and is connected, through line 4, to the scrubber section S. The scrubber section S comprises an inlet line 5a, an air outlet line 6 and is, in turn, connected to an accumulation tank SA, through line 7. The accumulation tank SA is connected, through lines 5 and 5a, to the scrubber S and through line 10a to a heat exchanger SC. The heat exchanger SC is in turn connected through line 10b to the vertical falling film heat exchanger (indicated in FIG. 1 with the abbreviation FF) having two semispherical caps 19a and 19b. The FF evaporator is also connected by means of lines 16 and 16a and 5a to the scrubbing section S and also includes an outlet line 18 of the vapours comprising the ammonia recovered from the gaseous discharge stream by means of the process of the present invention.

With reference to FIG. 1, a possible embodiment of the process of the present invention is described hereunder, even if this description does not limit the overall scope of the invention itself.

The gaseous discharge stream coming through line 1 from the prilling or granulation section P, consists of air contaminated by ammonia (about 50-150 mg/Nm$^3$ air), urea (about 100-200 mg/Nm$^3$ air) and traces of formaldehyde. This stream is sent to a washing section with water A. This section A has two feeding streams, a stream consisting of water, which is fed through line 2 and a gaseous discharge stream coming from the section P, through line 1. The gaseous stream at the outlet of the water washing section A, through line 4, consists of air, ammonia, urea and traces of formaldehyde. Part of the urea present in the initial gaseous stream has therefore been eliminated by the water washing and can be found in the aqueous solution at the outlet through line 3. This is preferably sent to the vacuum concentration section (not shown in the figure) of the urea synthesis plant, for the recovery of the latter.

The gaseous stream at the outlet of the washing section with water A, through line 4, is sent to the scrubber section S, where it is subjected to a washing with an acid aqueous solution of $(NH_4)_2HPO_4$ and $(NH_4)H_2PO_4$ having an overall concentration of the phosphate ions ranging from 30 to 40% by weight, a pH ranging from 5 to 6 and a temperature ranging from 30 to 50° C., with the formation of a gaseous stream comprising substantially pure air which is released into the atmosphere through line 6 and an aqueous solution enriched in $(NH_4)_2HPO_4$, which is fed through line 7 to an accumulation tank SA. In the water washing section A, a quantity of washing solution is adopted, which is sufficient for reducing the ammonia content to the desired value, normally to a value lower than 20 mg/m$^3$, and possible urea, normally to a value lower than 30 mg/m$^3$, in the gaseous stream. The volume of washing solution used preferably ranges from 0.5 to 3 liters per Nm$^3$ of gaseous stream.

The washing section with water A can also be absent and in this case the gaseous discharge stream 1 coming from section P is sent directly to the scrubber section S.

The accumulation tank SA, when present, allows a greater volume of washing solution to be available to be recycled through lines 5 and 5a to the scrubber section S. The process can therefore operate, according to the usual operation modes with recycling, with a more concentrated solution of the conjugate acid-base pair. The regenerated aqueous solution coming from the FF evaporator through lines 16 and 16a, is added to the washing solution leaving the accumulation tank SA, through line 5, after the addition of water, through line 21, to compensate that evaporated in the scrubber and in the FF evaporator. The streams 5 and 16a, thus joined, are recycled by means of line 5a to the scrubber S.

A part, more preferably from 0.2 to 50 of the stream used in the scrubber, of the acid aqueous solution containing $(NH_4)_2HPO_4$ and $(NH_4)H_2PO_4$, is sent, through lines 10a and 10b, from the accumulation tank SA to the FF evaporator, after heating to a temperature ranging from 80 to 100° C. in the heat exchanger SC, for example by thermal exchange with the stream leaving the FF evaporator through line 16 (the use in the heat exchanger SC of the stream leaving the FF evaporator through line 16 is not shown in FIG. 1).

In the FF evaporator, the aqueous solution containing $(NH_4)_2HPO_4$ and $(NH_4)H_2PO_4$ is treated at a temperature ranging from 120 to 210° C. and a pressure ranging from 0.15 to 1.5 MPa absolute, with the formation of a gaseous steam comprising $NH_3$, $H_2O$ and $CO_2$ which is removed through the outlet line 18 and can be recycled to the synthesis process of urea or alternatively to a synthesis process of ammonia.

In this preferred case, the vapours of water, ammonia and possible carbon dioxide, are released from the surface of the falling liquid film inside the tubes of the FF evaporator, and are then collected at the outlet of the head of the same equipment in line 18.

The exchanger fluid used in the FF evaporator can, for example, be pressurized water vapour, introduced by means of line 11. The above water vapour passes through the FF evaporator yielding its own heat to the walls of the tubes and then leaving the FF evaporator in the form of condensate through line 12.

The FF evaporator also returns a regenerated washing solution, having a higher content of diacid phosphate with respect to the ingoing aqueous solution, but a substantially identical pH, due to the high overall concentration of $HPO_4^{2-}$ and $H_2PO_4^-$ species and to the consequent high buffer effect. This solution is recycled to the acid scrubber section S, through lines 16, 16a and 5a. If necessary, phosphoric acid or ammonium phosphate can be added to this solution to compensate possible losses of buffer solution, for example, due to the entrainment of microdrops of liquid in the washing phase (a) of the gaseous stream.

The following embodiment example is provided for purely illustrative purposes of the present invention and should in no way be considered as limiting the protection scope defined by the enclosed claims.

EXAMPLE 1

A gaseous discharge stream coming from a urea production plant, consisting of air contaminated by ammonia (94 mg/$Nm^3$air), urea (185 mg/$Nm^3$air) and traces of formaldehyde, was subjected to the process according to the present invention. With the plant functioning under regime conditions, 1,490,000 $Nm^3$/h of the above stream were sent directly to a scrubber operating with a washing solution consisting of a buffer solution of $(NH_4)_2HPO_4$ and $(NH_4)H_2PO_4$ having a pH equal to about 5.3.

The following products were thus obtained from the scrubber:
- a purified gaseous stream (1,490,000 $Nm^3$/h) having a concentration of ammonia equal to about 9.4 mg/$Nm^3$ (abatement efficiency of the scrubber equal to about 90%) and a concentration of urea equal to about 18.5 mg/$Nm^3$ (abatement efficiency of the scrubber equal to about 90%);
- a stream of 3,014,400 kg/h of aqueous solution containing the ammonium salt consisting of water (1,907,512 kg/h), $H_2PO_4^-/HPO_4^{2-}$ ions (838,003 kg/h), ammonia in the form of $NH_3$ and $NH_4^{1+}$ (217,037 kg/h) and urea (51,848 kg/h).

The aqueous solution leaving the scrubber was then fed to an accumulation tank (SA) from which a stream having the same composition was extracted in continuous, and then fed to the FF evaporator with a flow-rate of 12.0 $m^3$/h, equal to 14,400.0 kg/h (density of the solution 1,200 Kg/$m^3$). The stream entering the FF evaporator, having a pH equal to 5.3, consisted of water (9,112.3 kg/h), $H_2PO_4^-/HPO_4^{2-}$ ions (4,003.2 kg/h), ammonia in the form of $NH_3$ and $NH_4^+$ (1,036.8 kg/h) and urea (247.7 kg/h).

In the FF evaporator, the aqueous solution coming from the accumulation tank SA was maintained at a temperature of 180° C. and a pressure of 0.7 MPa. The following products were thus separated in the FF evaporator:
- a gaseous stream (1,860.2 kg/h), containing ammonia and having the following composition
  water (vapour)=1,411.6 kg/h
  $NH_3$=266.6 kg/h
  $CO_2$=181.9 kg/h
- a regenerated washing solution (12,570.5 kg/h) having a pH equal to 5.3 and the following composition
  water (vapour)=7,626.4 kg/h
  $H_2PO_4^-/HPO_4^{2-}$=4,003.2 kg/h
  $NH_3/NH_4^+$=940.9 kg/h On comparing the quantity of ammonia present in the gaseous stream 18 leaving the FF evaporator (266.6 kg/h) with the content of ammonia in the form of $NH_3$ and $NH_4^+$ in the stream entering the FF evaporator (1,036.8 kg/h), a separation efficiency of step (b) of the present invention equal to 22.7% molar of ammonia, was observed (the percentage takes into account the ammonia fraction deriving from the hydrolysis of 247.7 kg/h of urea).

The above regenerated washing solution was recycled to the scrubber to integrate a stream of solution coming from the tank SA (3,000,000 kg/h). For this recycling, it was necessary to add a stream of make-up water of 6,411.6 kg/h to the regenerated washing solution, to compensate the quantity of water transferred to the gaseous stream purified by evaporation during the scrubbing step, and also the water evaporated in the FF evaporator.

The invention claimed is:

1. A process for the recovery of ammonia contained in a gaseous stream, said process comprising the following phases:
    (a) subjecting the gaseous stream containing ammonia to a washing with an aqueous washing solution having a pH lower than 7.0, with the formation of a purified gaseous stream and an aqueous solution containing an ammonium salt;
    (b) treating the aqueous solution containing the ammonium salt coming from phase (a) in a vertical falling film heat exchanger at a temperature from 50 to 250° C. and an absolute pressure ranging from 50 KPa to 4 MPa absolute with the formation of a regenerated washing solution and a gaseous stream comprising $NH_3$ and $H_2O$;
    (c) recycling said regenerated washing solution to phase (a),
    wherein the heat exchanger comprises a plurality of tubes and, during the treating of phase (b), each tube of the falling film heat exchanger is loaded with the aqueous solution containing the ammonium salt in an amount of from 24 to 180 liter/h and the average residence time of the aqueous solution containing the ammonium salt within the tube ranges from 2 to 40 seconds.

2. The process according to claim 1, wherein phase (a) is carried out at a pH ranging from 5 to 6.5.

3. The process according to claim 1 or 2, wherein the gaseous stream fed to phase (a) is a gaseous discharge stream coming from a synthesis process of urea.

4. The process according to claim 3, wherein said gaseous discharge stream is air contaminated by ammonia and urea.

5. The process according to claim 4, wherein said gaseous discharge stream contains from 50 to 250 mg/$Nm^3$air of ammonia and from 30 to 200 mg/$Nm^3$air of urea.

6. The process according to claim 3, wherein said gaseous discharge stream containing ammonia comprises an inert gas selected from the group consisting of nitrogen, a noble gas, methane and a mixture thereof.

7. The process according to claim 3, wherein said gaseous discharge stream is at a temperature of about 45-100° C., and is subjected to a preliminary washing with water.

8. The process according to claim 1, wherein the aqueous washing solution of phase (a) is a buffer solution comprising a conjugated acid-base pair of at least one selected from the group consisting of phthalic acid, oxalic acid, phosphoric acid, citric acid, an aryl-phosphonic acid, an alkyl-phosphonic acid, and carbonic acid.

9. The process according to claim 8, wherein said buffer solution has a pH ranging from 5 to 6.5 and an overall molar concentration of the conjugated acid-base pair is from 0.5 M to 5 M.

10. The process according to claim 7, wherein the buffer solution comprises the pair, $H_2PO_4^-/HPO_4^{2-}$, wherein the overall concentration of the $H_2PO_4^-/HPO_4^{2-}$ species varies from 20 to 40% by weight.

11. The process according to claim 1, wherein, when the gaseous stream fed to phase (a) does not contain urea, phase (b) is carried out at a temperature ranging from 100 to 140° C. and at a pressure ranging from atmospheric pressure to 0.2 MPa absolute.

12. The process according to claim 1, wherein, when the gaseous stream fed to phase (a) also contains urea, phase (b) is carried out at a temperature ranging from 100 to 230° C., preferably from 120 to 210° C., and at a pressure ranging from atmospheric pressure to 2.0 MPa absolute.

13. The process according to claim 12, wherein phase (b) is carried out at about 0.7 MPa and at a temperature of about 180° C., the gaseous stream comprises comprising $NH_3$, $H_2O$ and $CO_2$ and has a concentration of ammonia of from 5 to 35% by weight.

14. The process according to claim 1, further comprising: releasing said purified gaseous stream which is formed in phase (a) into the atmosphere.

15. The process according to claim 1, wherein said purified gaseous stream which is formed in phase (a) comprises air or another inert gas having an ammonia content varying from 10 to 25 mg/$Nm^3$ air and, optionally, a urea content ranging from 5 to 30 mg/$Nm^3$ air.

16. The process according to claim 1, wherein said gaseous stream comprising $NH_3$, $H_2O$ and optionally $CO_2$ which is formed in phase (b) is recycled to a synthesis process of urea or to a synthesis process of ammonia.

17. The process according to claim 1, wherein the quantity of water or acid, necessary for maintaining the desired concentration and pH, is added to the regenerated aqueous washing solution coming from phase (b).

18. Equipment for effecting the process according to claim 1, comprising:

a washing unit where a gaseous stream containing ammonia is put in contact with an aqueous washing solution, a vertical falling film heat exchanger for treating an aqueous stream of an ammonium salt with the formation of a gaseous stream comprising $NH_3$ and $H_2O$ and a regenerated washing solution, wherein said heat exchanger has no reflux and is a tube-bundle heat exchanger of cylindrical form, with a central body having a length of from 1 to 10 m, and two semispherical caps situated at the ends of the cylinder, and is connected to the washing unit from which said heat exchanger receives the aqueous stream of an ammonium salt.

19. A process for recovering ammonia from a gaseous stream comprising ammonia, comprising:
(a) washing the gaseous stream containing ammonia with an aqueous washing solution having a pH of lower than 7.0 to form a purified gaseous stream and an aqueous solution comprising an ammonium salt;
(b) treating the aqueous solution containing the ammonium salt in a vertical falling film heat exchanger at a temperature of from 50 to 250° C. and at an absolute pressure of from 50 KPa to 4 MPa absolute to form a regenerated washing solution and a gaseous stream comprising $NH_3$ and $H_2O$; and
(c) recycling the regenerated washing solution to the washing (a);
wherein during the treating the pH of the aqueous solution containing the ammonium salt is lower than 7.0.

20. The process of claim 19, wherein during the treating (b) the pH of the aqueous solution is substantially the same as the pH of the aqueous washing solution having a pH lower than 7.0 of the washing (a).

21. The process of claim 19, wherein during the treating (b) the aqueous solution containing the ammonium salt has the same pH as the aqueous washing solution having a pH lower than 7.0 of the washing (a).

* * * * *